United States Patent [19]

Dale et al.

[11] 4,340,095
[45] Jul. 20, 1982

[54] MATERIAL TRANSFERRING APPARATUS

[76] Inventors: John D. Dale, 1211 W. Rovey; David G. Knotter, 4634 N. 44th St., both of Phoenix, Ariz.

[21] Appl. No.: 76,072

[22] Filed: Sep. 17, 1979

[51] Int. Cl.³ .............................................. B65B 1/06
[52] U.S. Cl. ........................................ 141/1; 141/98; 141/319; 141/332; 141/381; 215/100 R; 241/100; 241/169.1
[58] Field of Search ......... 141/1, 11, 12, 98, 319–322, 141/331, 332, 379–381; 241/30, 100, 169, 169.1, 168; 215/100 R

[56] References Cited

U.S. PATENT DOCUMENTS 2,602,596 7/1952 Jones et al. ....................... 241/169.1
4,105,142 8/1978 Morris ............................. 141/319 X

*Primary Examiner*—Frederick R. Schmidt
*Attorney, Agent, or Firm*—Laff, Whitesel, Conte & Saret

[57] ABSTRACT

A hand-held pulverizer has a grinding section and a flat, detachable collecting plate into which pulverized material falls as it is ground. The pulverized material may be transferred from the collecting plate to a relatively small jar by attaching the broad end of a funnel-like device to the collecting plate, attaching a relatively small jar to the narrow end of the funnel, and inverting the funnel. When all of the material is transferred to the jar, the funnel may be removed, and a cap attached to the jar.

3 Claims, 3 Drawing Figures

MATERIAL TRANSFERRING APPARATUS

The present invention relates to material transferring apparatus, and more particularly to apparatus in which pulverized material may be transferred from a relatively large collecting plate to a relatively small jar, for storage and transportation, with minimum or no loss of material.

BACKGROUND OF THE INVENTION

Present hand-held pulverizers generally have a collecting plate beneath a grinder into which pulverized material is gathered as it is ground. To insure that all of the material is collected, the walls of the pulverizer are usually straight, and the collecting plate is relatively flat, spanning the entire bottom of the grinder.

When the material is pulverized, the grinder portion of the pulverizer is removed from the collecting plate. Some manufacturers provide a cap approximately the size of the collecting plate which may be secured over the collecting plate to form a container for the material. The operator may then store or transport the pulverized material in the container for use at a later time.

The container just described is relatively large and cumbersome, since it usually is the same diameter as the pulverizer. Thus, there is a need for apparatus which enables the operator to transfer pulverized material from a relatively large collecting plate to a relatively small jar, with a minimum loss of material.

Accordingly, an object of this invention is to provide new and improved material transferring apparatus for hand-held pulverizers.

Another object of this invention is to provide means for transferring pulverized material from a relatively large collecting plate to a relatively small jar with a minimum or no loss of material.

Yet another object of this invention is to provide means for storing pulverized material in a relatively small jar.

SUMMARY OF THE INVENTION

In keeping with one aspect of the invention, a hand-held pulverizer has a flat collecting plate into which pulverized material falls as it is ground. After the material has been pulverized and deposited on the collecting plate, the pulverizer is removed from the collecting plate and the broad end of a funnel-like device is securely fixed to the collecting plate. A jar which is relatively small compared to the collecting plate is removably attached to the narrow end of the funnel. The funnel is turned over, and the pulverized material falls through the funnel into the jar. The jar is then removed from the funnel. The jar is capped, and the ground material is stored in the jar until it is needed.

BRIEF DESCRIPTION OF THE DRAWINGS

The above mentioned and other features of this invention will become more apparent, and the invention itself will be best understood by reference to the following description of an embodiment of the invention, taken in conjunction with the accompanying drawings, in which.

DETAILED DESCRIPTION OF THE INVENTION

Figure 1:
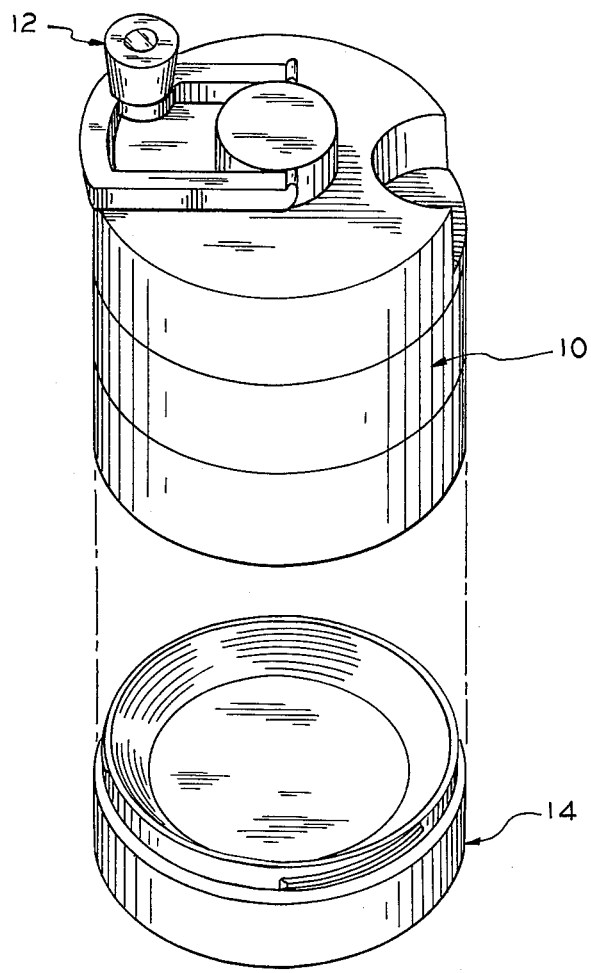
FIG. 1 is a partially exploded view of a hand-held pulverizer having a detachable collecting plate at the bottom thereof.

Referring to FIG. 1, a hand-held pulverizer generally designated by the numeral 10 has grinding means 12 for pulverizing material placed in the pulverizer. The bottom of pulverizer 10 includes means for holding the pulverized material on a collecting plate 14 removably attached to the bottom of pulverizer 10, such as by a screw thread connecting means.

Figure 2:
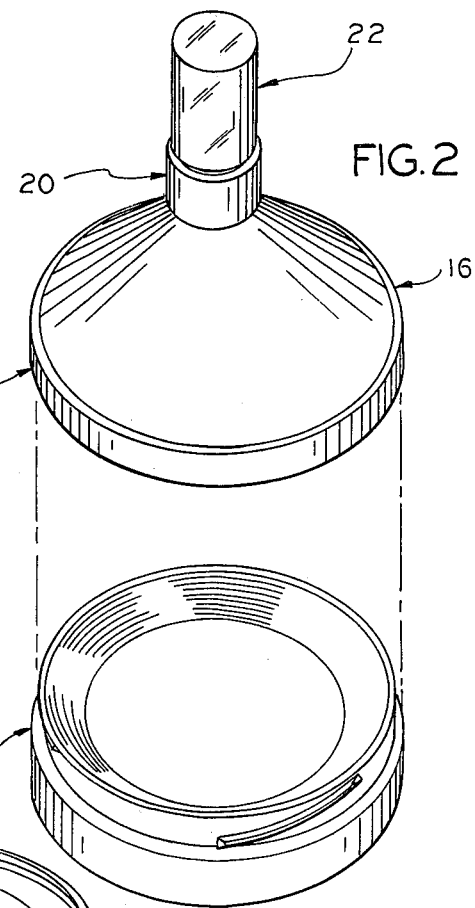
FIG. 2 is a partially exploded view of the collecting plate of FIG. 1, a detachable funnel and a jar.

Referring to FIG. 2, a funnel 16 is provided having a broad end 18 and a narrow end 20. The broad end 18 may be attached by screw-like thread means or any other suitable means to the collecting plate 14, which has corresponding attachment means. A jar 22 is provided for attachment by screw-like thread means, or any other suitable means, to narrow end 20 of funnel 16. Jar 22 is relatively small compared with collecting plate 14. A jar cap 24 is provided which covers and seals the jar 22 when it is removed from funnel 16, as will be explained.

In use, the operator grinds material in the pulverizer 10 by rotating grinding means 12. The pulverizer 10 is held so that the pulverized material falls by its own weight to the collecting plate 14. The bottom surface of collecting plate 14 is relatively flat, which provides increased stability when holding the device, or when the pulverizer is placed on a table or other suitable surface during use.

Figure 3:
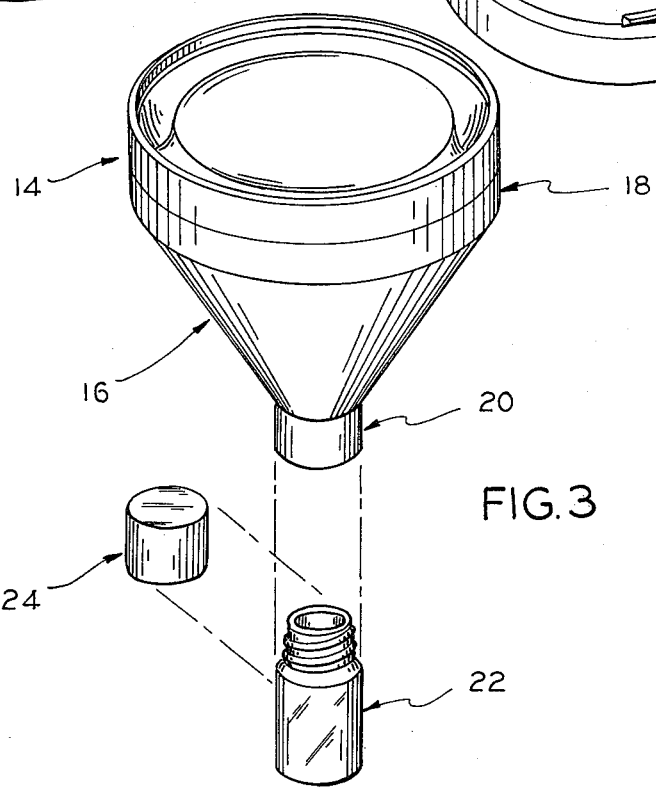
FIG. 3 is a partially exploded view of a collecting plate, a funnel, detachable jar and a detachable jar cap after inversion of the funnel to fill the jar.

When all of the material is pulverized and gathered in collecting plate 14, the body of pulverizer 10 is removed from the collecting plate 14. The broad end 18 of funnel 16, with jar 22 attached to narrow end 20, is next attached to collecting plate 14, in the position shown in FIG. 2. When the broad end 18 of funnel 16 is attached to collecting plate 14, the funnel 16 is turned upside down (FIG. 3) and the pulverized material falls into jar 22 by the force of gravity. The operator may tap the funnel 16 or the collecting plate 14 to insure that all of the material falls into the jar 22, but this is not considered necessary for the successful operation of the device.

When all of the pulverized material is in the jar 22, the jar 22 is removed from the narrow end 20 of the funnel 16, and sealed by the jar lid 24. The jar 22 may then be stored or transported easily, without losing any of the pulverized material.

The many advantages of the invention should now be apparent. Pulverized material may be transferred from a relatively large collecting plate to a relatively small jar with a minimum or no loss of pulverized material. Storage and transportation of the material is more efficient due to the relatively small size of the jar.

While the principles of the invention have been described above in connection with specific apparatus and applications, it is to be understood that this description is made only by way of example and not as a limitation on the scope of the invention.

I claim:

1. A method of transferring pulverized material from a pulverizer to a small jar comprising the following steps:

pulverizing a material in a pulverizer having a removably attached collecting plate;

gathering said pulverized material in said collecting plate;

detaching said collecting plate from said pulverizer;

attaching said collecting plate to a funnel having a narrow end and a broad end, said collecting plate being attached to said broad end of said funnel;

attaching the mouth of a jar to the narrow end of said funnel;

inverting said funnel, said collecting plate, and said jar, thereby transferring said pulverized material from said collecting plate to said jar;

removing said jar from said funnel; and attaching a cap to said jar.

2. An apparatus for transferring pulverized material from a pulverizer to storage, comprising: means to pulverize said material; a collecting plate forming the bottom of said pulverizing means for accumulating material from said pulverizing means; compatible attachment means on the bottom of said pulverizing means and on the top of said collecting plate for removably connecting them; a funnel which is at least partially conical in shape for transferring said material from said collecting plate, said funnel having a broad opening at one end corresponding in diameter to said collecting plate and a narrow opening at the opposite end; means on said funnel at said broad end to removably attach said funnel to said attachment means on the top of said collecting plate; storage means which is smaller in volume than said collecting plate and having an opening at the top, whereby pulverized material in said collecting plate can be transferred through said funnel to said storage means when the narrow end of said funnel is placed in communication with the opening in said storage means and the collecting plate and attached funnel are inverted.

3. The apparatus of claim 2 including compatible attachment means on the narrow end of said funnel and on said storage means for removably connecting them.

* * * * *